2,841,395
OCCUPANT PROPELLED ROUNDABOUT

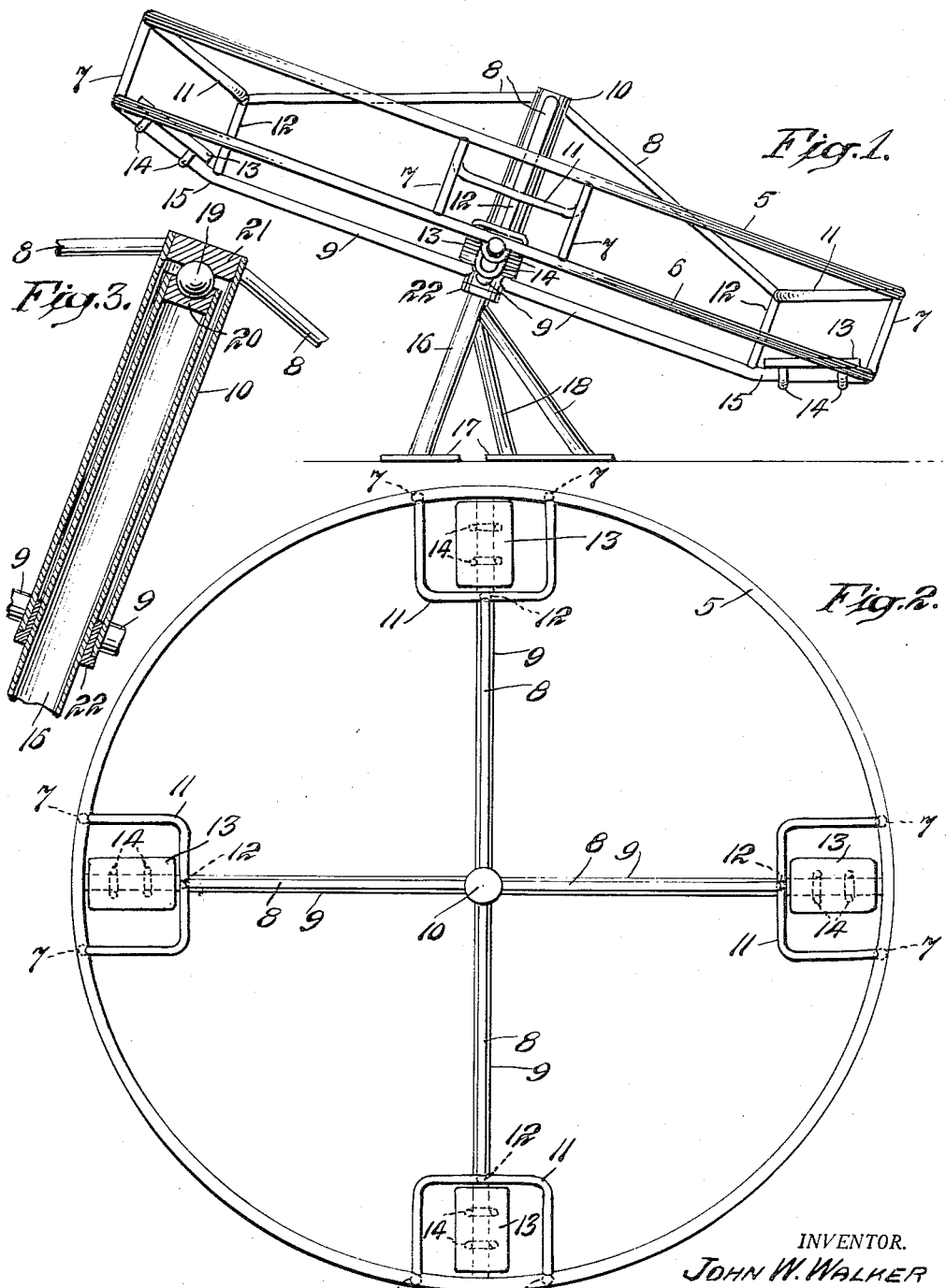

John W. Walker, Wichita, Kans.

Application March 12, 1957, Serial No. 645,615

3 Claims. (Cl. 272—33)

The invention here disclosed relates to amusement rides in the nature of round-abouts, merry-go-rounds and the like.

Objects of the invention are to provide simple and relatively inexpensive apparatus suited to children's playgrounds, fairs, carnivals and the like, and which will provide desired entertainment and exercise with full safety.

Particular objects of the invention are to provide a circular form of ride in which rotation will be effected by riders of a wheel-like structure and in which the riders will have the thrill of alternately touching the ground for propulsion and then rising through the air in the rotation of the wheel.

The foregoing and other desirable objects are attained in this invention by certain novel features of construction, combination and relation of parts, including in particular the provision of a wheel structure journaled on an upright inclined axis and carrying in the rim of the same, closed compartment forming frames and seats for the passengers arranged so that at the low side of the wheel, the riders may push against the ground with their feet and then lose contact with the ground as they rise and travel around the high side of the wheel.

Various other objects and features of the invention are set forth and will appear in the course of the following specification.

The drawing accompanying and forming part of the specification illustrates a present commercial embodiment of the invention, but structure may be modified and changed as regards such illustration, all within the true intent and scope of the invention as hereinafter defined and claimed.

Fig. 1 in the drawing is a side elevation of the wheel on its inclined support.

Fig. 2 is a plan view of the wheel.

Fig. 3 is an enlarged broken sectional detail of the ball bearing mount for the wheel.

The wheel illustrated is of light openwork structure, free of projections and smoothly rounded to avoid injury of any sort.

Specifically, it is shown as made up of upper and lower rings 5, 6 vertically spaced by struts or spreaders 7 and supported by upper and lower downwardly inclined and horizontal spokes 8 and 9 connected at the inner ends to upper and lower ends of a hub forming bearing sleeve 10.

U-shaped yokes 11, fastened at their ends to the upper ring, in line with the vertical struts 7, provide the boxes or compartments for the passengers.

The upper spokes 8 are shown secured at their outer ends to the inner arched portions of the yokes and these inner portions of the yokes are shown braced and fixedly secured in vertically spaced relation to the lower spokes 9 by struts 12.

This provides a rigid, strong, well braced but light structure which can be made up quite inexpensively out of tubular stock with all parts connected by simple weld joints.

The U-frames 11 in conjunction with the upright struts 7 and 12 and the upper and lower rings 5 and 6 form passenger enclosing compartments closed on all four sides, open at the top for ingress and egress.

The bottom spokes 9, in line with the top spokes 8 provide seating for the riders, being shown as carrying seat boards 13, secured over such spokes by staples or clips 14.

The outer ends of the bottom spokes, the portions carrying the seats, are shown as inclined upwardly at 15 to bring the seats at the low side to a substantially horizontal relation when the wheel is journaled on the inclined axis indicated in Fig. 1. To similar effect the yokes or loops 11 are inclined downwardly toward the center of the wheel, as shown in Fig. 1, to locate them substantially parallel with the seats.

The support for journaling the wheel at an incline is shown in Figs. 1 and 3 as an upright inclined tubular post 16 on a base 17, rigidly secured in such relation by inclined braces 18.

The hub sleeve 10 is shown in Fig. 3 as engaged over the upper end of the post with a bearing ball 19 between the closed upper end 20 of the post and the closed upper end 21 of the sleeve.

The lower end of the sleeve is shown as carrying an annular bearing bushing 22 riding the periphery of the post.

This construction provides a simple, strong and easily lubricated bearing for the wheel in the inclined relation shown.

With this construction the wheel can be readily lifted off the post or be returned to position thereon, lubrication is simple and the bearing portions are enclosed and fully protected.

While the passenger receiving frames or compartments are designed to fully protect the riders and hold them safely seated in the wheel, they are open at both top and bottom so that they can be easily stepped into at the low side of the wheel, at the right in Fig. 1, and so that in this position the feet may engage the ground for propulsion or wheel stopping purposes.

The rings forming the rim of the wheel are spaced a distance less than the body height of a normal person so that the arms and shoulders will be in the clear, enabling a seated individual to reach around in any direction for grasping the three sides of the U-frames as a handle bar or for holding on to the upper inclined spokes 8 or the upper ring 5.

Normally, the passengers may ride seated forwardly in the direction of rotation but the construction is such as to permit them to turn around on the seat and ride with legs extended outwardly between the vertical struts 7 or feet extended inwardly straddling the inner spacing struts 12.

The structure may be made up from readily available tubular stock at low cost. The parts are few and there are no separable or removable pieces to get out of order or to be taken away. The bearing parts are protected against weather and other conditions. When necessary the wheel can be taken off the stand by simply lifting it off the inclined post.

The effect of the wheel rotating on the inclined axis is to give the passengers the impression of running along the ground and then rising and flying through the air and again returning to contact with the ground. This provides exhilarating, healthful exercise and amusement and with entire safety since the riders are confined in their seated positions with legs free at the bottom for balance and propulsion and arms free at the top for holding to the surrounding portions of the wheel.

One or any number of persons may ride the wheel. One person with little effort may give the wheel sufficient impetus to carry it over the top center and the acceleration resulting in the downward travel provides extra thrill.

What is claimed is:

1. An amusement ride, comprising an upright post, a hub forming sleeve journalled on said post, a set of tubular upper spokes radiating from the upper end of said sleeve, a set of tubular lower spokes radiating from the lower end of said sleeve in line with said upper spokes, a tubular upper rim forming ring secured to the outer ends of said upper spokes, a tubular lower rim forming ring secured to the outer ends of said lower spokes, seats on the outer ends of said lower spokes adjoining said lower ring, the upper spokes having passenger enclosing yokes at the outer ends of the same adjoining the upper ring and in position over the seats on the lower spokes, the struts securing said upper and lower spokes and said upper and lower rings in vertically spaced apart relation, less than the body height of passengers to be carried, and whereby passengers riding the seats are fully protected within the perimeters of the two rings and in position to reach out and hold on to the surrounding upper spoke and ring structure.

2. Amusement ride comprising a passenger carrying wheel made up of an upright elongated central hub sleeve, lower spokes connected with the lower end of the sleeve and having upwardly inclined outer end portions, seats on said upwardly inclined end portions of said lower spokes, upper and lower rim forming rings, the upwardly inclined end portions of the lower spokes being secured to the lower ring, vertical spacer struts secured to the upper and lower rings at opposite sides of said seats, U-shaped yokes having their ends secured to the upper ring in line with the upper ends of said spacing struts, said yokes extending radially inward of the upper ring in substantially parallel relation with the upwardly inclined seat carrying portions of the lower spokes, struts connecting the inner portions of said yokes with the lower spokes, upper spokes extending from said yokes in line with said last-mentioned struts to the upper end portions of the hub forming sleeve, an inclined supporting post, said hub sleeve being engaged over the upper end of said inclined supporting post, a ball bearing between the upper end of said post and the upper end of said hub sleeve and an anti-friction bearing between the lower end of the hub sleeve and post.

3. An amusement ride for children, rotatable by engagement of the feet of riders with the ground and comprising a wheel and an inclined post for rotatably supporting said wheel inclined from the horizontal, said wheel comprising a central hub sleeve journalled on said post, a lower set of tubular spokes radiating from the lower end of said sleeve and having upwardly inclined outer end portions, a tubular lower ring secured to said upwardly inclined outer end portions, seats on said upwardly inclined outer end portions of said lower spokes within and adjoining said lower ring, an upper tubular ring above said lower ring, upright struts on said lower ring at opposite sides of said seats and spacing said upper ring a distance above said lower ring, enclosure forming U-shaped guard yokes having their ends secured to said upper ring substantially in line with said struts and projecting radially inwardly from said upper ring over said seats substantially parallel with said upwardly inclined outer end portions of the lower spokes, upright struts extending from said lower spokes into engagement with the inwardly projecting portions of said U-shaped yokes and forming with said first mentioned struts and yokes safety enclosures within the rings of the wheel for protection of riders on said seats, and upper spokes extending on downward inclines from the upper ends of said sleeve into supporting engagement with said safety enclosures.

References Cited in the file of this patent

UNITED STATES PATENTS

| | | |
|---|---|---|
| 1,791,227 | Russell | Feb. 3, 1931 |
| 1,836,289 | Smith | Dec. 15, 1931 |
| 2,035,168 | Kregling | Mar. 24, 1936 |